United States Patent [19]

Takemura

[11] 4,345,269

[45] Aug. 17, 1982

[54] IMAGE PICK-UP APPARATUS

[75] Inventor: Yasuo Takemura, Kawasaki, Japan

[73] Assignee: Tokyo Shibaura Denki Kabushiki Kaisha, Kawasaki, Japan

[21] Appl. No.: 144,918

[22] Filed: Apr. 29, 1980

[30] Foreign Application Priority Data

May 7, 1979 [JP] Japan ................... 54-55593

[51] Int. Cl.³ ............................. H04N 9/07
[52] U.S. Cl. ......................... 358/43; 358/44
[58] Field of Search ............ 358/43, 44, 41, 47, 358/48, 50

[56] References Cited

U.S. PATENT DOCUMENTS

| | | | |
|---|---|---|---|
| 4,107,732 | 8/1978 | Adcock et al. | 358/43 |
| 4,205,336 | 5/1980 | Magumo | 358/43 |
| 4,227,206 | 10/1980 | Nagumo | 358/44 |
| 4,245,241 | 1/1981 | Sato | 358/44 |
| 4,246,598 | 1/1981 | Bock | 358/43 |

FOREIGN PATENT DOCUMENTS

| | | | |
|---|---|---|---|
| 2729107 | of 0000 | Fed. Rep. of Germany | 358/44 |
| 7810320 | 10/1978 | Netherlands | 358/44 |

OTHER PUBLICATIONS

Color Imaging System Using a Single CCD Area Array, Dillon et al., IEEE Trans on Electron Devices vol. ED-25, No. 2, Feb. 78, pp. 102–106.
"Charge Coupling Improves its Image, Challanging Video Camera Tubes", Electronics, Jan. 18, 1973, pp. 162–169, Tompsett et al.

Primary Examiner—Michael A. Masinick
Attorney, Agent, or Firm—Oblon, Fisher, Spivak, McClelland & Maier

[57] ABSTRACT

An image pick-up apparatus which derives red, blue and green signals respectively corresponding to red, blue and green light components of an incident light, and produces an NTSC signal based on these color signals, is disclosed. The green light component in the incident light is separated from the red and blue light components and is then converted into a green light signal by a first solid state image pick-up device. The red and blue signal components are passed through a stripe filter including achromatic transparent areas and yellow filter areas and disposed in a stripe fashion, and are then converted into a corresponding color signal by said second solid state image pick-up device. The image pick-up apparatus includes a first demodulator for extracting a red signal component from the color signal, a second demodulator for extracting a magenta signal component from the color signal, and a subtractor for calculating a difference between the output signals from the first and second demodulators to produce a blue signal component.

4 Claims, 16 Drawing Figures

| Ye | T  | Ye | T  | Ye | T  | Ye | T  | Ye |
|----|----|----|----|----|----|----|----|----|
| T  | Ye | T  | Ye | T  | Ye | T  | Ye | T  |
| Ye | T  | Ye | T  | Ye | T  | Ye | T  | Ye |
| T  | Ye | T  | Ye | T  | Ye | T  | Ye | T  |
| Ye | T  | Ye | T  | Ye | T  | Ye | T  | Ye |

FIG. 9

| Ye | R  | Ye | M  | Ye | R  | Ye | M  | Ye |
|----|----|----|----|----|----|----|----|----|
| R  | Ye | M  | Ye | M  | Ye | R  | Ye | M  |
| Ye | R  | Ye | M  | Ye | R  | Ye | M  | Ye |
| R  | Ye | M  | Ye | M  | Ye | R  | Ye | M  |
| Ye | R  | Ye | M  | Ye | R  | Ye | M  | Ye |

FIG. 10

| Ye | M  | Ye | M  | Ye | M  | Ye | M  | Ye |
|----|----|----|----|----|----|----|----|----|
| R  | Ye | R  | Ye | R  | Ye | R  | Ye | R  |
| Ye | M  | Ye | M  | Ye | M  | Ye | M  | Ye |
| R  | Ye | R  | Ye | R  | Ye | R  | Ye | R  |
| Ye | M  | Ye | M  | Ye | M  | Ye | M  | Ye |

FIG. 11

| T | R  | T  | Ye | T | R  | T  | Ye | T | R |
|---|----|----|----|---|----|----|----|---|---|
| R | T  | Ye | T  | R | T  | Ye | T  | R | T |
| T | R  | T  | Ye | T | R  | T  | Ye | T | R |
| R | T  | Ye | T  | R | T  | Ye | T  | R | T |
| T | R  | T  | Ye | T | R  | T  | Ye | T | R |

IMAGE PICK-UP APPARATUS

The present invention relates to an image pick-up apparatus using solid state image pick-up devices such as charge coupled devices.

Recently, there have been developed various image pick-up apparatus for a color television system using semiconductor devices such as charge coupled devices (CCD) or bucket brigade devices. In a two-plate type image pick-up apparatus, for example, an incident light is partially projected onto a first solid state image pick-up device through a color filter, for causing the first solid state image pick-up device to produce a green signal component G. Similarly, the incident light is partially projected onto the second solid state image pick-up device through a color stripe filter, causing the second solid state image pick-up device to produce a red signal component R and a blue signal component B, individually. In a single plate type image pick-up device, by projecting a color stripe filter with different color areas provided corresponding to picture elements, the solid state image pick-up device is caused to produce red, green and blue signal components R, G and B. Generally, a light sensitivity of the solid state image pick-up device such as CCD is high for lights ranging from 700 to 800 nm and is about 1/10 that of the just-mentioned lights, for the light of the wave length of about 450 nm. To reproduce a good quality color picture by combining the color signal components R, G and B thus obtained, the blue signal component B must be amplified to the same level as the red and green components R and G for the purpose of the white balance adjustment. The S/N ratio of the blue signal component is much smaller than that of the red signal component R, lowering the S/N ratio of the overall image pick-up device.

It is a common practice to apply a proper bias light to the solid state image pick-up device, for the purpose of improving a charge transfer efficiency and a resolution of the image pick-up device. Practically, it is very difficult to apply uniformly the bias light over the entire surface of the solid state image pick-up device. A poor surface condition of the image pick-up device may provide a variation of the light sensitivity. The variations in the intensity of the bias light and sensitivity seldom give rise to a serious problem for the red signal component R of high signal level. However, such variations may give bad influence on the blue signal component B with low signal level. The variations have a greater adverse effect on the image pick-up device than random noise produced in the amplifier circuit, mainly causing a dark current distribution to vary. The variation of the dark current considerably damages a picture quality of a dark portion on the light receiving surface of the solid state image pick-up device. This makes it difficult to form a clear color picture.

Accordingly, an object of the present invention is to provide an image pick-up apparatus with a simple construction to produce a distinct color image.

According to one aspect of the present invention, there is provided an image pick-up device comprising: solid-state image pick-up means having a plurality of picture element areas, color filter means disposed on a light-receiving side of the solid state image pick-up means for separating an incident light into a first color light and a second color light including a first color light component corresponding to the first color light and a second color light component, a color signal extracting circuit for extracting a first color signal corresponding to the first color light from those picture element areas which have received the first color light and for extracting a second color signal corresponding to the second color light from those picture element areas which have received the third color light, and an operation circuit coupled with the color signal extracting circuit for producing a third color signal corresponding to a difference between the first and second color signals.

Other objects and features of the invention will be apparent from the following description taken in connection with the accompanying drawings, in which:

FIG. 7 shows the connection of a matrix circuit which may be used in place of a subtractor used in the image pick-up apparatus shown in FIG. 1; and FIGS. 8 to 11 are schematic illustrations of a matrix patterned color filter which may be substituted for the color stripe filters shown in FIGS. 3 and 6.

Figure 1:
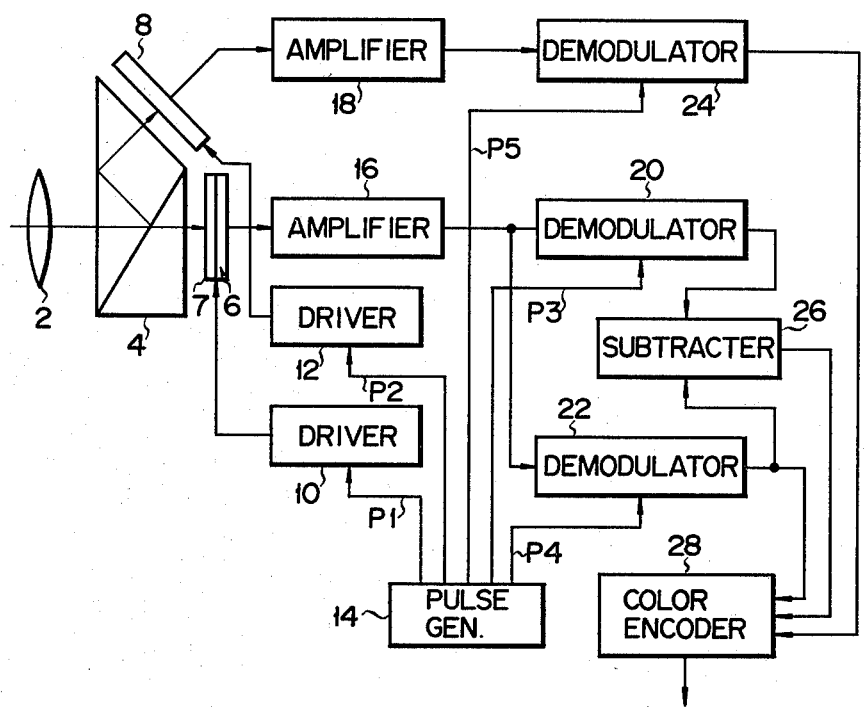
FIG. 1 is a schematic block diagram of an embodiment of an image pick-up apparatus according to the present invention.

Referring to FIG. 1, there is illustrated a schematic block diagram of an image pick-up apparatus according to an embodiment of the invention. The image pick-up apparatus includes an image pick-up lens 2 for introducing an incident light to a dichroic prism 4, through an infrared-ray cut filter (not shown), a couple of solid state image pick-up devices for receiving the spectral components coming through the dichroic prism 4, and driver circuits 10 and 12 which respond to pulse signals P1 and P2 synchronized with each other generated from a pulse generator 14 to supply driving signals to the solid state image pick-up devices 6 and 8, respectively. The solid state image pick-up devices 6 and 8, each having a physical dimension of 6.6 mm×8.8 mm with picture elements 512×340, for example, respond respectively to the driving signals from the driver circuits 10 and 12 to apply electrical signals corresponding to the incident light to amplifiers 16 and 18. The output signal from the amplifier 16 is applied to demodulators 20 and 22, while the output signal of the amplifier 18 is applied to a demodulator 24. The demodulators 20 and 22 respectively respond to pulse signals P3 and P4 applied from the pulse generator 24 to produce demodulated output signals to a subtracter 26. The demodulator 24 responds to a pulse signal P5 from the pulse generator 14 to produce a demodulated output signal which is applied to a color encoder 28, together with the output signals from the demodulator 22 and the subtracter 26.

Figure 2:
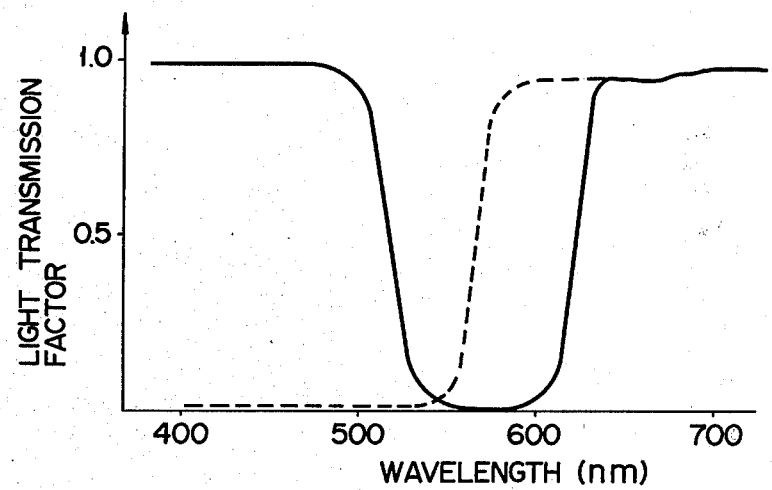
FIG. 2 is a graphical representation of light transmission characteristics of a dichroic prism and a color stripe filter which are used in the embodiment shown in FIG. 1.

The operation of the image pick-up apparatus shown in FIG. 1 will be described referring to FIGS. 2 and 4.

Figure 3:
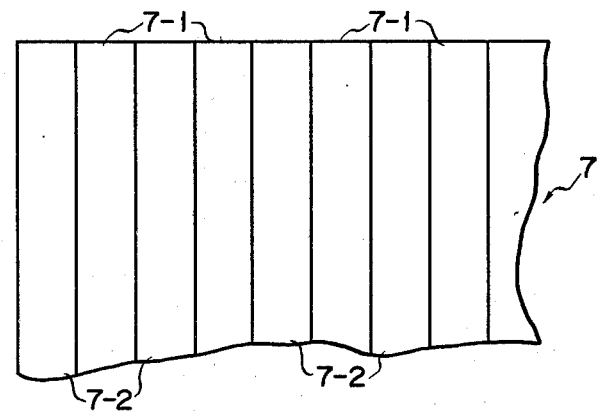
FIG. 3 is a schematic diagram of part of the color stripe filter used in the embodiment shown in FIG. 1.

A red light component and a blue light component in the incident light coming through the image pick-up lens 2 straightly travel through the dichroic prism 4 and reach the image pick-up device 6. The travelling direction of a green light component is changed by the dichroic prism 4 and then the green light component is led to the solid state image pick-up device 8. As indicated by a solid line in FIG. 2, the dichroic prism 4 reflects the green light component with wave lengths ranging from about 500 to 620 $\mu$m at the interface thereof while it permits the magenta component including the red and blue light components with the other wave lengths to transmit therethrough. The magenta component is led to a picture element area of the solid state image pick-up device 6, through a color stripe filter 7 having achromatic filter sections (permitting all the visible rays to transmit therethrough) 7-1 and yellow color filter sections 7-2, which are alternately arranged in a horizontal direction, as shown in FIG. 3. Each of the filter sections is disposed facing picture elements arrange on a respective column of the solid state image pick-up device 6 disposed vertically. Those filters 7-1 and 7-2, each having a width of 26 $\mu$m, permit the lights of about 550 $\mu$m or more, i.e. the red light component in the incident light coming through the dichroic prism, to pass therethrough, as indicated by a broken line in FIG. 2. Therefore, the magenta light component and the red light component are respectively projected onto the picture element areas of the solid state image pick-up device 6 disposed adjacently in the horizontal direction.

Figure 4A:
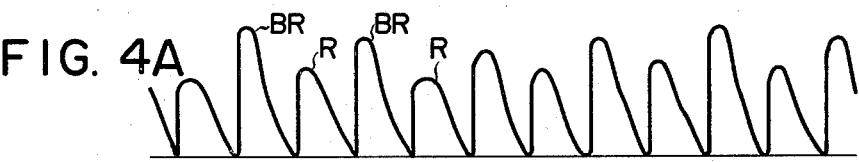
FIGS. 4A to 4F are waveforms used for explaining the operation of the image pick-up apparatus shown in FIG. 1.
Figure 4B:
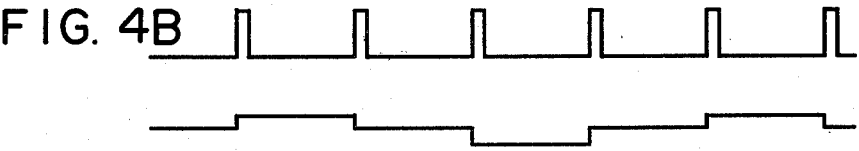
Figure 4D:
Figure 4E:
Figure 4C:

The solid state image pick-up devices 6 and 8 respectively respond to drive signals from the drive circuits 10 and 12 to produce successively electric signals corresponding to the light intensities from the picture element areas disposed horizontally, for example, in a known method. After the electrical signal production for the picture elements on one horizontal line is completed, next signal production for the picture element area of the succeeding horizontal line is started in a similar manner. From the picture element area on a horizontal line of the solid state image pick-up device 6, a color signal including a blue-red signal component BR and a red signal component R as shown in FIG. 4A is produced, for example. The color signal generated from the solid state image pick-up device 6 is amplified by an amplifier 16 and then applied to the demodulators 20 and 22. The demodulator 20 responds to a pulse P3 shown in FIG. 4B generated from the pulse generator 14 to sample the blue-red signal component BR from the input signal and to produce time-sequentially picture element signal components each having the sampling level over a period corresponding to two picture elements, as shown in FIG. 4C. The demodulator 22 similarly responds to a pulse P4 whose phase is different from the pulse shown in FIG. 4 by a time corresponding to one picture element, as shown in FIG. 4B, and samples the red signal R based on the input signal to produce time-sequentially picture element signal components each having the sampling level over a period corresponding to two picture elements, as shown in FIG. 4E. The demodulator 24 responds to a pulse P5 with a frequency two times that of the pulse P3 to sample the green signal taken out from each picture element and to hold the sampling level over a period corresponding to one picture element. In this way, the magenta signal (the blue and red signal) the red signal and the green signal are obtained from the demodulators 20, 22 and 24, respectively.

Figure 4F:

The output signals from the demodulators 20 and 22 are supplied to the subtractor 26 which in turn produces a blue signal corresponding to the blue signal for each picture element area, as shown in FIG. 4F. On the basis of output signals from the demodulators 22 and 24, and the subtracter 26, the color encoder 28 produces an NTSC color signal.

Generally, a uniform bias light is applied over the entire light receiving surfaces of the solid state image pick-up devices 6 and 8 in the image pick-up apparatus of this type. The output signals from the solid state image pick-up devices 6 and 8 each include an image pick-up signal component and dark current component which is produced by the bias light and superposed on the image pick-up signal component. The output signals from the solid state image pick-up devices 6 and 8 further include dark current components caused by thermal excitation taking place in the solid state image pick-up devices 6 and 8. The dark current components superposed on the image pick-up signal components distribute unevenly due to characteristic variations of the CCD elements and the stains on the light receiving surfaces of the solid state image pick-up devices. The characteristic variations of the CCD elements and the stains on the light receiving surfaces give great influences upon particularly the lower frequencies of the image pick-up signals, i.e. the blue signal component. In this case, the image pick-up signals derived from the adjacent CCD elements or picture element areas are affected by the same degree owing to the characteristic variation and the stains. Therefore, the magenta signal M and the red signal R derived from the adjacent picture element areas in the solid state image pick-up device 6 include substantially the same noise signals. Consequently, the blue signal B obtained by subtracting the red signal R from the magenta signal M is little influenced by the stains on the light receiving surface of the image pick-up device and the variation in the characteristics of the CCD elements. To obtain a good white balance, the blue signal B is amplified at an amplification factor approximately 10 times that for the red signal R. In this case, however, the blue signal B little includes the noise signal, so that it does not cause any particular problem. The amplitudes of the red signal R and the green signal G are sufficiently larger than that of the noise signal. Accordingly, the noise signal is negligible.

As described above, in the image pick-up apparatus of the above-mentioned embodiment, the adverse effect of the unevenness of the bias light is negligible. This fact enables the number of the light emission diodes required for the bias light source to be reduced. Accordingly, the light source construction is made simple. Because of the use of the achromatic filter sections 7-1 and the yellow filter sections 7-2 for the filter 7, it is possible to apply a white bias light or a red bias light to the solid state image pick-up device 6.

Figure 5:
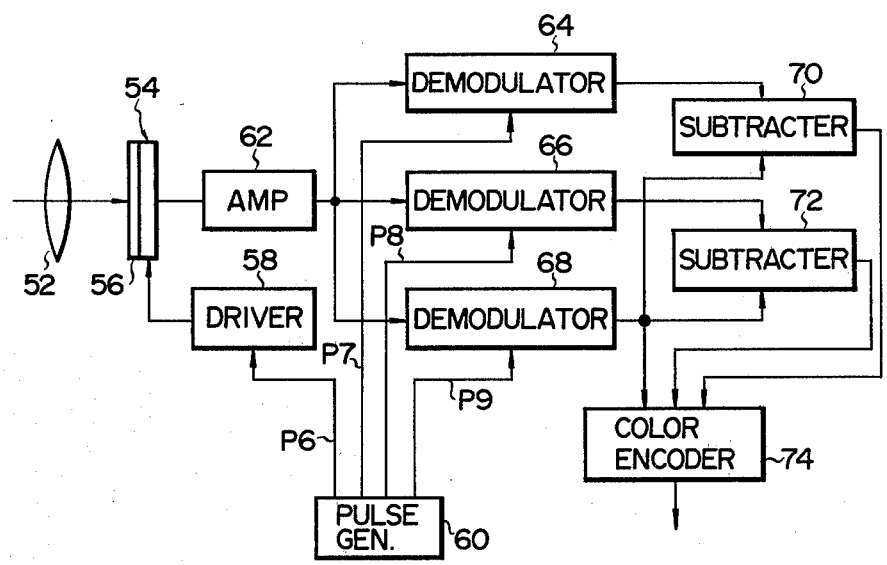
FIG. 5 is a schematic block diagram of another embodiment of the image pick-up apparatus according to the invention.

FIG. 5 shows an image pick-up apparatus according to another embodiment of the present invention. In the image pick-up apparatus, an incident light passes through a lens 52 to impinge upon a solid state image pick-up device 56 having magenta filter sections 56M, yellow filter sections 56Ye and red filter sections 56R. Those filter sections are each disposed corresponding to the picture element areas arranged in a vertical direction, each filter section having a width of 26 $\mu$m. The solid state image pick-up device 54 responds to a drive signal generated from a drive circuit 58 in response to the output pulse P6 from a pulse generator 60 to successively and repetitively produce the image pick-up signals corresponding to the respective picture element areas, i.e. the magenta signal component M, the yellow signal component Ye and the red signal component R. The image pick-up signal is amplified by an amplifier 62 and then is supplied to demodulators 64, 66 and 68. The demodulator 64 supplies to a subtracter 70 a magenta signal M including a blue and red signal component (B+R) derived from a picture element area facing a magenta filter section 56M of the filter 56, in response to a pulse P7 from the pulse generator 60. The demodulator 66 responds to a pulse P8 with a delay time corresponding to one picture element area with respect to the pulse P7 to supply a yellow signal Ye including a red and green signal component (R+G) to a subtracter 72. The demodulator 68 responds to a pulse P9 with a time delay corresponding to a picture element area with respect to the pulse P7 to supply a red signal R to the subtracters 70 and 72. Upon receipt of those signals, the subtracters 70 and 72 produce blue and green signals R and B, which are applied to a color encoder 74, together with a red signal R derived from the demodulator 68.

As described above, the present embodiment also obtains the blue signal B by subtracting the red signal from the magenta signal derived from the demodulator 64. Accordingly, the image pick-up apparatus of the present embodiment may also be little influenced by the adverse effect by the stains on the light receiving surface of the solid state image pick-up device 56 and the characteristic variation of the CCD elements, as in the case of the first embodiment.

While having been described by using the specific embodiments, the present invention is not limited to such embodiments. For example, the blue signal B, which is formed by using the subtracter 26 in the FIG. 1 embodiment, may be formed by the combination of a matrix circuit for subtracting the red signal R from the magenta signal M to derive a blue signal B and then producing three output image pick-up signals Y, (R-Y) and (B-Y), where Y denotes a luminance signal, based on the output signals from the demodulators 20, 22 and 24 and a color encoder 82 for producing an NTSC signal by processing the output signals from the matrix circuit 80, as shown in FIG. 7.

In the embodiment shown in FIG. 1, the dichroic prism 4 may be replaced by a half-mirror or a semi-transparent mirror, and a green filter and a magenta filter may be respectively placed in front of the solid state image pick-up devices 6 and 8. Also in the same embodiment, the solid state image pick-up devices 6 and 8 may be disposed in contact with the dichroic prism 4.

Figure 6:
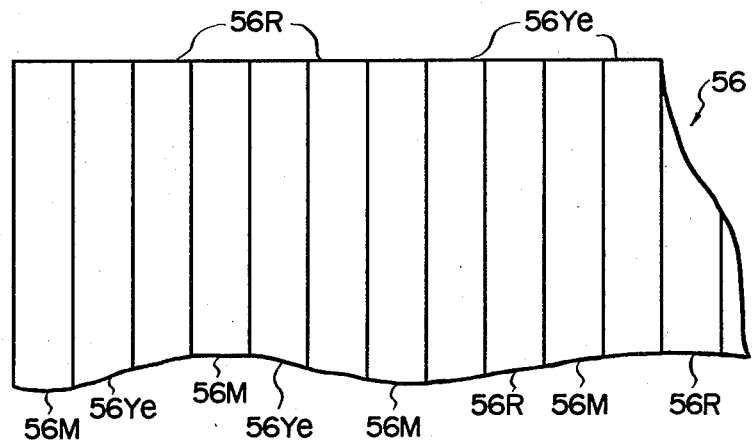
FIG. 6 is a schematic diagram of a color stripe filter used in the embodiment shown in FIG. 5.
Figures 7, 8:
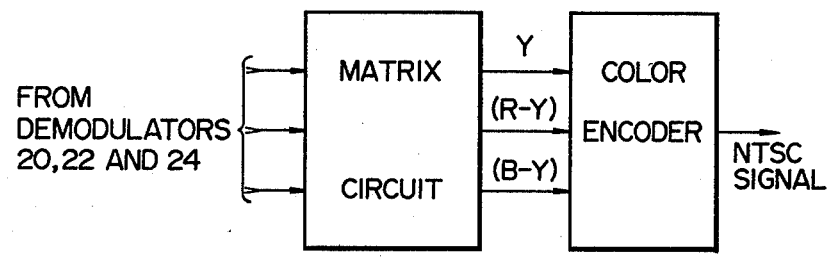

The stripe filter shown in FIG. 3 for the two-plate type image pick-up apparatus in the above-mentioned embodiment may be replaced by a filter having portions T allowing all the visible light to transmit therethrough and yellow filter portions Ye, which are arranged for the respective picture elements as shown in FIG. 8. Additionally, a filter having magenta light filter portions M, red light filter portions R and yellow light filter portions Ye, which are arranged for the respective picture elements, as shown in FIGS. 9 to 11 may be used for the one-plate type image pick-up apparatus instead of the stripe filter shown in FIG. 6.

The drive circuit 12 in the embodiment in FIG. 1, which is so coupled as to respond to the pulse P2, may be connected so as to respond to the pulse P1, as in the case of the drive circuit 10. Further, the solid state image pick-up devices 6 and 8 may be driven by the drive circuit 10 with omission of the drive circuit 12.

The embodiment shown in FIG. 5 forms a green light signal by the combination of the demodulators 66 and 68, and the subtracter 72. The green light signal may directly be taken out from the demodulator 66 by replacing the yellow filter sections 56Ye of the color filter shown in FIG. 6 by the green filter sections.

What is claimed is:

1. An image pick-up apparatus comprising:
   a solid state image pick-up device having a plurality of picture element areas;
   color separation means for separating an incident light into a first color light, a second color light, and a third color light, wherein the third color light includes a first color light component corresponding to said first color light and a second color light component;
   a color signal extracting circuit for extracting a color signal including first to third color signal components corresponding to said first to third color lights from those picture element areas of said solid state image pick-up device which have respectively received said first to third color lights;
   first to third demodulation circuits connected to said color signal extracting circuit to respectively produce first to third output signals which respectively correspond to said first to third color signal components; and
   a first operation circuit connected to said first and third demodulation circuits to produce at least a fourth color signal component corresponding to a difference between said first and third color signal components.

2. An image pick-up apparatus according to claim 1, further comprising color encoding means coupled with said first and second demodulation circuits and said first operation circuit for processing said first and second color signal components from said first and second demodulation circuits and said fourth color signal from said first operation circuit.

3. An image pick-up apparatus according to claim 2, wherein said first color light is a red light and said third color light includes red and blue light components.

4. An image pick-up apparatus according to claim 3, in which said color separation means is a color filter having red filter sections, yellow filter sections and magenta filter sections, which are disposed facing said picture element areas of said solid state image pick-up device, which further includes a second operation circuit for producing a fifth color signal component corresponding to a difference between said first and second color signal components derived from said first and second demodulation circuits, and in which said color encoding means processes said first, fourth and fifth color signals generated from said first demodulating circuit and said first and second operation circuits.

* * * * *